(12) United States Patent   (10) Patent No.: US 8,310,245 B2
Saikkonen et al.   (45) Date of Patent: Nov. 13, 2012

(54) MODELLING A POWER PRODUCTION NETWORK FOR DISTRIBUTING THE LOAD

(75) Inventors: Ari Saikkonen, Vaasa (FI); Tom Kaas, Solf (FI); Stig Klockars, Vaasa (FI)

(73) Assignee: Wartsila Finland Oy, Vaasa (FI)

( * ) Notice: Subject to any disclaimer, the term of this patent is extended or adjusted under 35 U.S.C. 154(b) by 387 days.

(21) Appl. No.: 12/810,111

(22) PCT Filed: Dec. 2, 2008

(86) PCT No.: PCT/FI2008/050702
§ 371 (c)(1),
(2), (4) Date: Jun. 22, 2010

(87) PCT Pub. No.: WO2009/083639
PCT Pub. Date: Jul. 9, 2009

(65) Prior Publication Data
US 2010/0280816 A1  Nov. 4, 2010

(30) Foreign Application Priority Data
Dec. 27, 2007  (FI) ...................................... 20075966

(51) Int. Cl.
*G01R 31/34* (2006.01)
(52) U.S. Cl. ...................... 324/537; 324/722; 324/76.11; 703/18
(58) Field of Classification Search .................. 324/537, 324/772, 609, 76.11; 703/18
See application file for complete search history.

(56) References Cited

U.S. PATENT DOCUMENTS

| 4,808,835 A | 2/1989 | Tsuji et al. |
| 2004/0117077 A1 | 6/2004 | Kahle et al. |
| 2007/0143090 A1 | 6/2007 | Skjetne et al. |

FOREIGN PATENT DOCUMENTS

WO   WO 9201944 A1 * 2/1992

OTHER PUBLICATIONS

Kai Huang, et al., A novel algorithm for agent based reconfiguration of ring-structured shipboard power system, Industry Applications Conference, 2005. Fourtieth IAS Annual Meeting. Conference Record of the 2005 Hong Kong, China Oct. 2-6, 2005, Piscataway, N.J., USA, IEEE, vol. 2, pp. 1311-1316.

* cited by examiner

*Primary Examiner* — Vincent Q Nguyen
(74) *Attorney, Agent, or Firm* — Muncy, Geissler, Olds & Lowe, PLLC

(57) ABSTRACT

The modelling arrangement of the configuration situation of the electric power transmission network according to the invention comprises a modelling element (7) designed to be installed in each generator of the electric power transmission network. The modelling element (7) is arranged to measure the state of the said switches until an open switch is detected and to detect the corresponding generator on the basis of the closed switch and thus to model the power transmission network comprising the detected generators and the area of the power transmission network belonging to the same electric network via closed switches.

16 Claims, 3 Drawing Sheets

Figure 4:
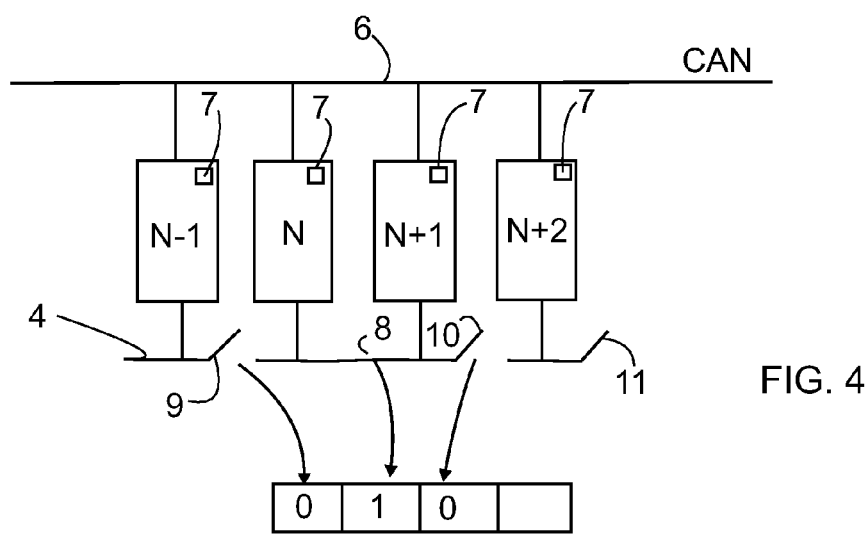

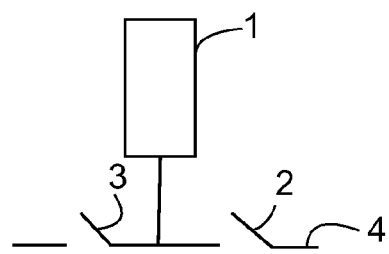
FIG. 1
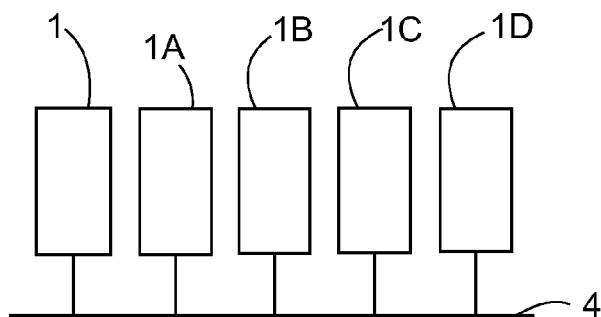
FIG. 2
FIG. 3
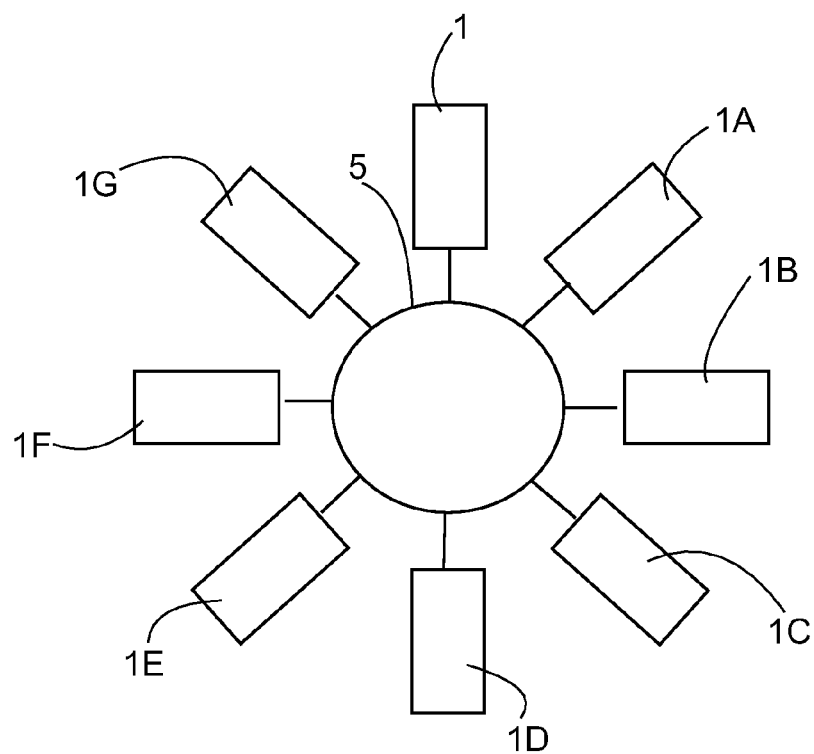

MODELLING A POWER PRODUCTION NETWORK FOR DISTRIBUTING THE LOAD

FIELD OF INVENTION

The present invention relates to an electric power transmission network to which electricity-producing devices and loads can be connected. The invention especially relates to electrical power transfer networks in ships.

BACKGROUND ART

The electric power transmission networks of ships are relatively small. Generators are connected thereto for supplying the ship's demand of electric power. Each generator is driven by a power source, such as a diesel engine. The generators run in the electric network at the same speed so as to have the same frequency in all places of the electric network. It is not possible to economically store electricity, so the production of electricity must correspond to the consumption of electricity of the network. Thus there must be some kind of arrangement in the power transmission network for distributing the load among the generators.

A known way is to use droop adjustment, i.e. deviation adjustment. Each generator has a power production line as a function of the frequency of the network. When the load is large, the frequency of the network tends to increase, and when the load is small, the frequency tends to increase. Thus, the disadvantage is that the frequency of the constant state of the system depends on the load of the system.

Another way is to use so-called isosynchronic load distribution. In this method the average load of the system is used for establishing the set values for the generators for distributing the load. The principle of the isosynchronic adjustment is similar to deviation adjustment, but it does not depend so much on the load of the network.

Digital data communication buses have become more common to replace the older analog buses used for load distribution. The advantages of digital buses are their accuracy, reliability, lack of disturbances. Analog solutions have, however, been very adaptable to various configurations of the network. With a digital solution, it is difficult to mimic an analog power transmission network. Typically the power transmission network comprises switches the state of which can be changed, if necessary, either automatically or manually. Software, circuit board or other apparatus used for load distribution easily becomes very complex.

BRIEF DESCRIPTION OF THE INVENTION

The aim of the present invention is to reduce the above-mentioned disadvantages caused by digital solutions. The aim is achieved as described in the main claim. The dependent claims describe the various embodiments of the invention.

The modelling arrangement of the configuration situation of the electric power transmission network comprises a modelling element 7 designed to be installed in each generator of the electric power transmission network. In the power transmission network each generator 1 can be connected to other generators via two separate connection routes provided with a switch 2, 3. The power transmission network is a line or a loop and the generators have consecutive identifiers. The modelling element 7 is arranged to measure the state of the said switches on both connection routes until an open switch is detected at the routes and to detect the corresponding generator on the basis of the closed switch and to model the power transmission network comprising the detected generators and the area of the power transmission network belonging to the same electric circuit via closed switches.

LIST OF FIGURES

Figure 5:
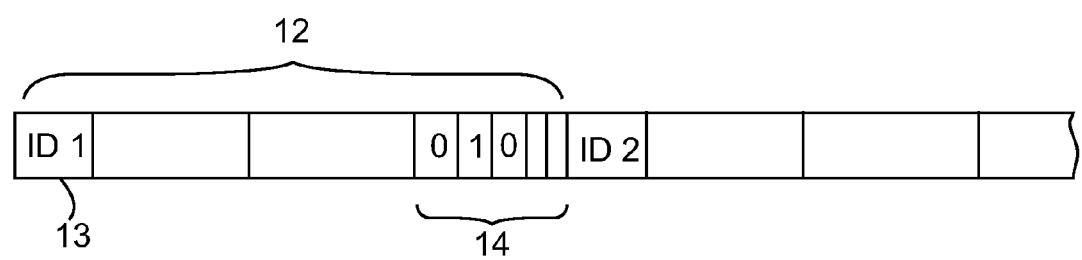
Figure 6:
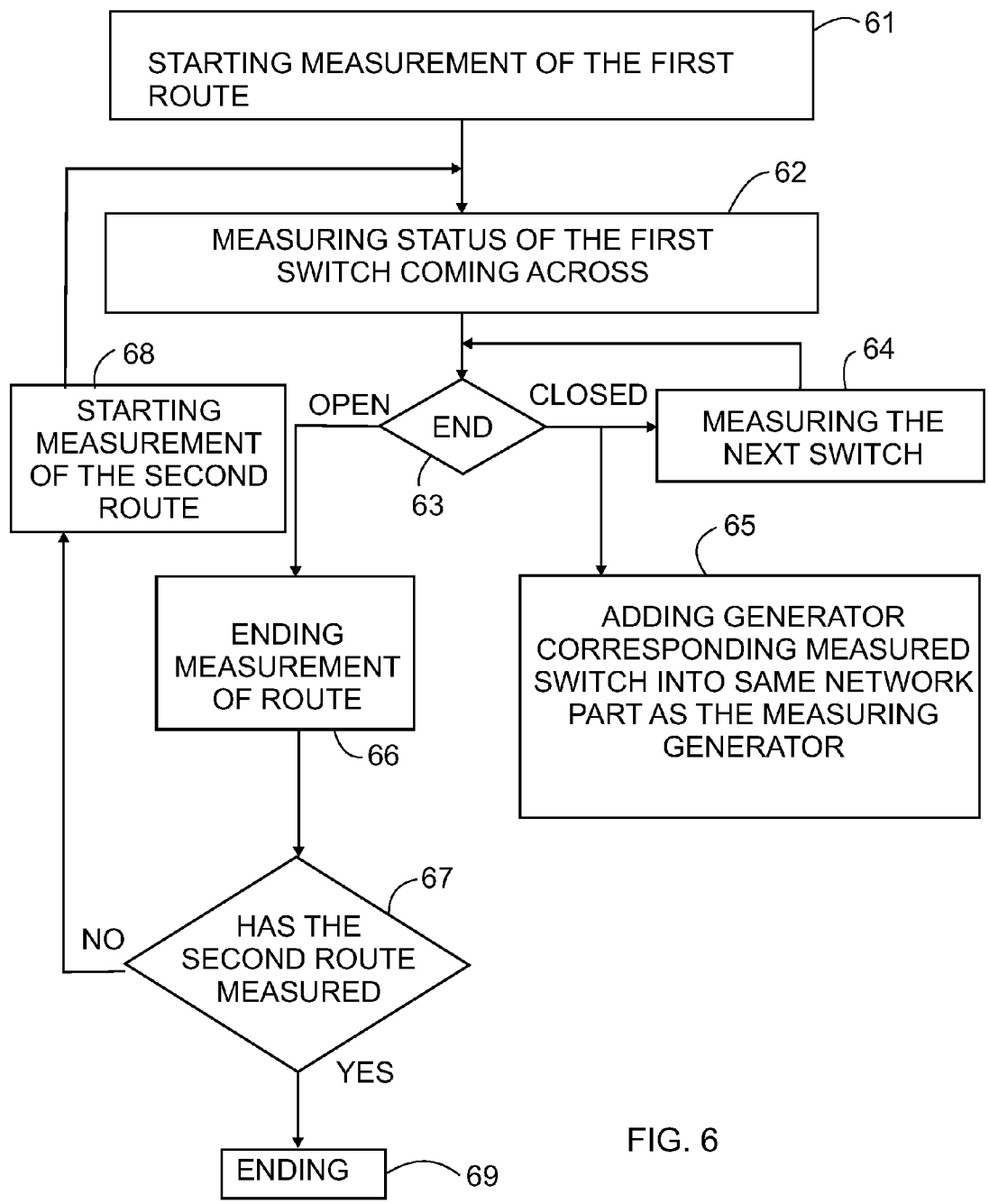

In the following the invention is described in more detail by reference to the figures in the appended drawings, in which FIG. 1 illustrates an example of the power transmission network connection of the generator according to the invention, FIGS. 2 and 3 illustrate the possible network topologies, FIG. 4 illustrates the detection of the network according to the invention, FIG. 5 is an example of a data communications vector sent in the data communications network and FIG. 6 is an example of the inventive method.

DESCRIPTION OF THE INVENTION

FIG. 1 illustrates an example of a generator 1 and its connection to a power transmission network 4. As can be seen, the generator is connected to the power transmission network by two switches 2, 3. Thus, the part between the switches can be interpreted as being a part of the power transmission network, because electric current can flow through it when at least one switch is closed. Due to two switches, electric power can be fed from the generator to both directions of the power transmission network 4 or to either direction only. Generator 1 is driven by, for example, an internal combustion piston engine or a gas turbine. Due to the use of two generator-specific switches the power transmission network is very adaptable. Thus, each generator has two connection routes to the rest of the network.

FIGS. 2 and 3 illustrate possible network topologies. The power transmission network 4, 5 can be a line or a loop. These are the only possible network topologies for detecting of the network according to the invention. In relatively small networks, such as in ships, this is not a disadvantage. In fact, this can facilitate planning of the network.

Each generator 1-1G has its own identifier. Consecutive machines in the network have consecutive identifiers. If a new generator is added to a point in an existing network, it and the generators after it must be given a new identifier. Thus the identifier of the generator can be used for outlining the position of the generator, as is shown later.

FIG. 4 illustrates an example of the operation according to the invention. In order to make isosynchronic load sharing possible, a number of parameters/signals must be transmitted between generators. A CAN bus (Controller Area Network) 6 is used for transmitting the data. The transmission takes place as a common transmission, i.e. all generators see the same data. The data are sent in, for example, a data vector (FIG. 5) comprising generator-specific elements 12. Preferably the generator-specific element begins with the generator identifier 13, subsequent to which there are fields for various signal data, parameters and status data 14 of the switches. Each generator updates the element shown to it.

In the example of FIG. 4 the generator N+1, more specifically the network determining element 7 of the generator determines the statuses of the power transmission network 4. The determining is made by measuring, for example, wave impedance from the power transmission network for determining whether the switches are closed or open. The determining process is started in one direction in the network. It is preferable to determine the checking directions and sequence in order to utilize the generator-specific identifiers. In this text the directions are determined either "forward" or "backward". The checking directions can, however, be named as desired. Additionally the checking direction sequence can also be carried out in the preferred sequence: "forward" first or "backward" first.

In the situation of FIG. 4 the generator N+1 starts determining the statuses of the switches "backwards", whereby the first encountered switch 8 is observed to be closed, i.e. its status value is 1 in this example. The network determining element 7 can from this measurement detect that the generator N belongs to the same area of the power transmission network belonging to the same electric circuit. The determining of status is continued "backwards", until the switch 9, being open, is detected. Such a switch gets a status of 0. An open switch means that the following generator does not belong to the same area of the power transmission network and the checking in that direction can be ended. All switches that have been detected to be closed simultaneously indicate the generators (the generator following the switch) belonging to the same group. This is possible by using consecutive generator-specific identifiers.

When one direction has been checked, the opposite direction will be checked, i.e. in the case of FIG. 4, "forward". It is detected that the first switch 10 to be checked is open, i.e. it receives a status of zero, and the check in direction "forward" is ended. Switch 11 is thus not checked, as it does not belong to the area of the same power transmission network. With the measured status data of the switches the network determination element can model the area of the power transmission network forming a common electric circuit. The status data of the switches are positioned in the field 14 of the generator-specific element 12 of the data vector reserved for the status data of the switches. See FIG. 5. The data vector is broadcast via the CAN bus to other generators. All generators can, when necessary, receive the information about the status data checks of the switches made by other generators through the broadcast data vector.

Each generator performs the switch status check and the modelling of the network area and comprises a similar network determination element 7 and independently determines which other generators belong to the same power transmission network. Thus no central unit is needed. The configuration of the network (changes in the status of the switches) can thus take place simultaneously.

The network determination element can be realized as a software or an electric circuit. The software can be loaded into the memory of the generator and executed in a processor suitable for the purpose. An embodiment for this is an ASIC circuit (Application Specific Integrated Circuit). Subsequent to modelling the part of the network the generators in the same electric circuit can divide the load by using the data about the average load of the network and the current load. Even though the figures do not show the loads, it is obvious that loads can be connected to the electric power transmission network.

FIG. 6 shows an example of the method according to the invention for modelling the configuration situation of the electric power transmission network of ships. The method is designed to be carried out in each generator of the electric power transmission network. As was mentioned in the above, in the network each generator 1 can be connected via two connection routes having equipped with switches 2, 3 to other generators, the electric power transmission network being a line or a loop and the generators having consecutive identifiers.

The method comprises the steps of: measuring 62, 64 the state of the said switches on both connection routes until an open switch 63, 66 is detected at the routes, detecting 63 the corresponding generator on the basis of the closed switch and thus modelling 65 the part of the power transmission network comprising the detected generators and the area of the power transmission network belonging to the same electric network via closed switches. In the detection and modelling step the configuration of the network and the consecutive identifiers of the network are used. The measuring step is preferably arranged to first measure the status of the switches of the first connection route, subsequent to which the status of the switches of the other connection route is measured.

In the example of FIG. 6 the measuring is started with the first route 61. The status of the first detected switch is measured 62. If the switch is closed 63, the next switch of the first route is measured. Because the switch is closed, the generator corresponding to it is added to the same part of the network as the generator 65 performing the measurement. Thus the modelling of the part of the network progresses at each measurement. When the measurement detects a switch with the status "open", the measurement 66 of the route is stopped and the system check whether the other route has already been measured 67. If both routes have been measured 67, measurement of the second route 68 is started. The measurement of the second route is performed in the same way as that of the first route.

The measurement data of the switches are arranged to be transmitted to a certain point of the data vector, the data vector being arranged to be commonly transmitted to other generators of the power transmission network. The method, like the apparatus, is arranged to repeatedly measure the status data of the switches.

As can be seen, the embodiment according to the invention can be carried out by means of a number of solutions. Thus, it will be apparent that the invention is not limited to the examples mentioned in this text. Thus, any inventive embodiment can be carried out within the scope of the invention.

The invention claimed is:

1. A modelling arrangement of a configuration situation of an electric power transmission network of ships, comprising:
   a modelling element designed to be installed into each generator of the electric power transmission network, each generator of the network being connectable to the other generators via two connection routes equipped with different switches, the power transmission network being a line or a loop and the generators having consecutive identifiers,
   wherein the modelling element is arranged to determine a state of said switches by measuring wave impedance in both connection routes until an open switch or end is detected at said routes, to detect on the basis of each closed switch the corresponding generator following the closed switch, and to model the power transmission network comprising the detected generators and an area of the power transmission network belonging to the same electric circuit via the closed switches.

2. The modelling arrangement according to claim 1, further comprising a data vector having generator-specific elements, a certain part of the element being designed for status data of the switches, the modelling element being arranged to update the generator-specific element of the data vector and the status data of the switches, and the data vector being arranged to be broadcast to other generators of the network.

3. The modelling arrangement according to claim 1, wherein the modelling element is arranged to use the identifiers of the generators.

4. The modelling arrangement according to claim 3, wherein the modelling element is arranged to first measure the first connection route and then measure the second connection route.

5. The modelling arrangement according to claim 4, wherein the modelling element is arranged to repeatedly measure the status data of the switches.

6. The modelling arrangement according to claim 4, wherein the modelling element is carried out by means of software.

7. The modelling arrangement according to claim 6, wherein the modelling element is installed in a generator.

8. The arrangement according to claim 7, wherein the generator is installed in the power transmission network.

9. The modelling arrangement according to claim 4, wherein the modelling element is carried out by means of an ASIC circuit or other electric circuit.

10. The modelling arrangement according to claim 9, wherein the modelling element is installed in a generator.

11. The arrangement according to claim 10, wherein the generator is installed in the power transmission network.

12. A method of modelling a configuration situation of an electric power transmission network, wherein the arrangement is designed to be carried out in each of the generators of the electric power transmission network, each generator of the network being connectable to other generators via two connection routes having different switches, the power transmission network being a line or a loop and the generators having consecutive identifiers, the method comprising the steps of:

determining the status of said switches by measuring wave impedance on both connection routes until an open switch is detected on said routes, detecting on the basis of each closed switch the corresponding generator following the closed switch, and modelling a part of the power transmission network comprising the detected generators and an area of the power transmission network belonging to the same electric circuit via the closed switches.

13. The method according to claim 12, wherein the configuration of the network and the consecutive identifiers of the generators are used in the detection and modelling steps.

14. The method according to claim 12, wherein the measuring step is arranged to first measure the status of the switches the first connection route, subsequent to which the status of the switches of the second connection route is measured.

15. The method according to claim 14, wherein the measurement data of the switches is arranged to be transmitted to a certain place of the data vector, the data vector being arranged to be broadcast to other generators of the power transmission network.

16. The method according to claim 15, wherein the method is arranged to repeatedly measure the status data of the switches.

\* \* \* \* \*